Nov. 26, 1963  J. DICKSTEIN ET AL  3,112,293
USE OF POLYFUNCTIONAL REAGENTS IN AMINE-ALDEHYDE COMPOSITIONS
Filed July 29, 1960
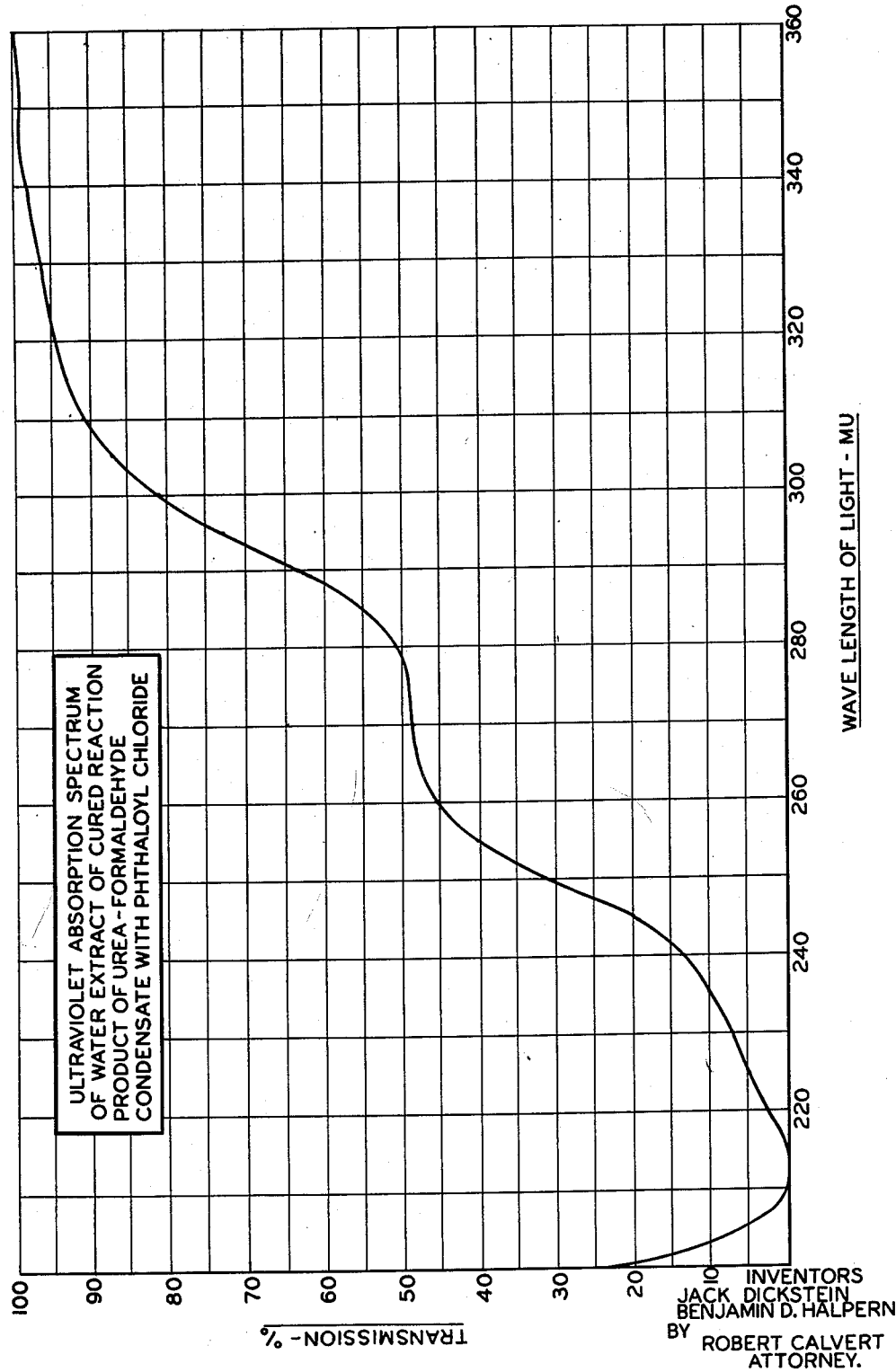
INVENTORS
JACK DICKSTEIN
BENJAMIN D. HALPERN
BY ROBERT CALVERT
ATTORNEY.

United States Patent Office 3,112,293
Patented Nov. 26, 1963

3,112,293
USE OF POLYFUNCTIONAL REAGENTS IN AMINE-ALDEHYDE COMPOSITIONS
Jack Dickstein, Elkins Park, and Benjamin D. Halpern, Jenkintown, Pa., assignors to The Borden Company, New York, N.Y., a corporation of New Jersey
Filed July 29, 1960, Ser. No. 46,299
8 Claims. (Cl. 260—65)

This invention relates to an improved aminoplast resin and the process of making it.

The aminoplast resins, of which the urea formaldehyde condensation product is the most common example, require an acid for their ultimate curing. In cured condition they lack adequate strength for some purposes and they release substantial amounts of formadehyde as shown by the fumes that, in many commercial operations, are objectionable.

Our invention provides a new aminoplast resin composition that requires no admixed acid for curing at high temperatures; is storable, i.e., without gelling, for two months or so; and when cured shows a reduced odor of formaldehyde.

Briefly stated, our invention comprises the herein described resins resulting from the action of a polyfunctional agent of specific type upon an aminoplast resin and the process of making the improved resin including the use, in the said action, of an acceptor for the acid that otherwise would appear as a by-product of the action.

The aminoplast resin selected for the action with the said agent is a further condensible or curable condensation product of formaldehyde, acetaldehyde, benzaldehyde, furfural, acetone or mixtures thereof with urea, melamine, dicyandiamide, thiourea, and substituted melamines or mixtures of these amides.

Reference is made to the attached drawing showing a photolithograph of the ultraviolet light absorption spectra of an aqueous extract from a representative one of our resin compositions in cured condition. This drawing shows an absorption band at around 270 mu that is not shown by the original reactants. The graph as here shown has been smoothed to eliminate the insignificant and minor irregularities traced by the recording pen, in making the graph during the determination of the absorption.

The proportion of the aldehyde may be varied within the ranges that are conventional in making the selected aminoplast condensation product, as within the range 1.5–2.5 moles and suitably 1.6–1.8 moles of the aldehyde to 1 mole of the selected amide.

The selected aldehyde and the amide such as urea are condensed in conventional manner, as at any usual pH for the condensation, such as 5.9–7.5.

The polyfunctional agent which we use in combination with the resin is one containing at least two acyl halide, sulfonyl halide or anhydride groups, the agent selected being stable in water to the extent that it is less rapidly reactive with the water than with said condensation product on which the agent is to act.

Examples of materials that illustrate the classes of polyfunctional agents to be used are the diacyl halides of aromatic and aliphatic carboxylic, disulfonyl halides, and the dianhydrides of acids containing at least four carboxyl groups. The following specific examples further illustrate the several classes of the polyfunctional agents: adipyl and fumaryl chlorides; o-, iso-, and terephthaloyl chlorides; alkenyl succinic acid dichlorides such as those derived from octenyl succinic anhydride; 1,4-benzenedisulfonyl chloride; p,p-dichlorodisulfonyl biphenyl; 1,3-naphthalenedisulfonyl chloride; pyromellitic dianhydride; dianhydride of 1,2,3,4-tetracarboxybutane and 2,3,4,6,7,8 - hexahydronaphthalene - 3,4,7,8-tetracarboxylic; dianhydride; and the compounds in which the halogens fluorine, bromine, or iodine, used in turn, replace chlorine, atom for atom, in the chlorine-containing compounds shown. The acids represented in these modifying agents are $C_4$–$C_8$ aliphatic and $C_6$–$C_{14}$ aromatic acids.

The polyfunctional agent used must contain at least two groups per molecule which are active (functional) with hydroxyl or amide groups of the aminoplast resin with the extraction of the hydrogen from each. These two or more groups are in addition to any normally polyfunctional groups which are converted in such reaction to acid, the acid being non-reactive for the present purpose. Thus phthalic acid or even its anhydride is not polyfunctional for our purpose; as soon as one of the carboxyl groups reacts, the other of the original anhydride group is no longer an anhydride and is no longer quickly reactive with the aminoplast resin or even with water. Phthaloyl chloride, on the other hand, is polyfunctional for us because, when on acyl group reacts with the production of hydrogen chloride as the by-product, the other group is still reactive in like manner.

The acceptor for the acid, included in or contacted with the aminoplast resin solution to neutralize the acid liberated as a by-product of the reaction with the polyfunctional agent is an alkali. Examples of suitable alkalis are sodium, potassium, or other alkali metal hydroxide or carbonate; tertiary alkyl or alkanol amines such as triethylamine or tetraethanolamine; and any known acid holding ion exchanger resin adjusted to the alkaline cycle so as to absorb the acid as generated, the exchanger being later separable from the product, as by filtration. Among the ion exchange resins we can use for this purpose are the anionic resins Amberlite IRA 400 or Dowex 1 (each the quaternary amine adjusted to the alkaline cycle, i.e. OH form of cross linked polystyrene) and Amberlite IR4B (anionic resin in OH form composed of a tertiary amine derivative of cross-linked polystyrene.

As to proportions, we use the polyfunctional agent in an amount within the range about 0.3–10 parts by weight and usually 0.5–1 part for 100 parts dry weight of the aminoplast resin to be treated.

The proportion of the acceptor used is that approximately equivalent to the amount of acid to be liberated during the action of the polyfunctional agent on the aminoplast resin, i.e., to the diacyl halide, dianhydride, or other polyfunctional agent used. This proportion of acceptor will maintain the pH at all times during the action of the modifier on the resin approximately at 7 or higher. Thus we use 2 equivalent weights of sodium hydroxide or other acceptor for 1 mole of phthaloyl chloride or for 1 mole of pyromellitic dianhydride.

As to conditions, we add the polyfunctional agent to an aqueous solution of the aminoplast resin, e.g., a so-called resin concentrate. The polyfunctional agent may be introduced in liquid or powder form or dissolved in any organic solvent therefor that is chemically inert to the said agent and the aminoplast resin, examples of which are acetone, trichloroethylene, methyl ethyl ketone, dioxane, carbon tetrachloride, or the like. While water soluble solvents are convenient to use, the insoluble liquids are also permissible inasmuch as the small amount required in any case becomes dispersed adequately in the aqueous resin concentrate.

The mixture of the aminoplast resin, polyfunctional agent, acid acceptor, and water are maintained in intimate contact, as for instance in a well agitated aqueous solution, until the pH which falls rapidly at first becomes practically constant.

If one wishes to avoid the addition of an acid acceptor, the agent may be introduced in the form of inert microcapsules. These capsules are formed by coacervation techniques with protective colloids such as gum tragacanth and gelatine. In use the agent is released when pressure is applied to the mixed system. Use of the encapsulation makes unnecessary the addition of an acid acceptor and substantially increases the number of difunctional reagents that may be used. Whereas the difunctional reagent otherwise must be one whose reaction with the resin is faster than with water, use of these protective colloids permitting the substitution of more water-sensitive polyfunctional reagents for those otherwise required.

The order of addition of the materials to the reaction vessel is ordinarily the aqueous concentrate of the resin first, the said acceptor, and then the polyfunctional agent.

The time required for the reaction at ordinary temperatures to the substantially constant pH is about 1–4 hours. In a representative run, the urea formaldehyde resin in the aqueous concentrate was at a pH of about 7.5. After admixing 2 moles of sodium hydroxide as the acid acceptor, we found that introducing 1 mole of phthaloyl chloride returned the pH of the solution to about 7.5 in the course of 5–10 minutes. Then the pH fell very slowly to a slightly lower value but not below 7. The by-product salt formed by the action of the acceptor with the acid generated during the reaction can be and was left in the solution for adhesive use.

During this use as the adhesive at temperatures as low as about 280° F., it is not necessary to have present any special admixed curing agent. Our improved resin compositions, although storable (non-gelling) in solutions for 2 months or longer at ordinary room or storage temperatures, will cure rapidly at the temperature of hot pressing and curing wood particle board, for example, ordinarily about 280°–325° F. When the resins are used as the adhesive in plywood manufacture, on the other hand, and cured at around 225–255°, adding a curing catalyst just before such use is recommended, this curing catalyst being ordinarily ammonium chloride, ammonium sulfate, ammonium thiocyanate or like acid salt.

Examination of an aqueous or organic solvent extract of our cured product, not including any conventional curing catalyst, by the ultraviolet absorption spectrum technique shows a band of light absorption that is not shown by any of the starting materials, as stated above.

The resins made as described have a storage life of 2 months or longer in water at ordinary storage temperatures. They do not require catalyst of curing at temperatures such as 280°–325°. They show reduced odor of formaldehyde and good strength in the final cured film all as stated. When used in films or particle boards of ¼ inch thickness, for instance, we have found increased modulus of rupture and increased internal bond as compared to results with the same aminoplast resin without the action thereon of our polyfunctional agent.

Once these results have been observed, various explanations may be advanced to explain the mechanism by which the resin is modified by the polyfunctional reagent. We consider that a small but definite cross linking occurs of type illustrated by the following somewhat idealized reaction which represents the action of urea formaldehyde condensate with phthaloyl chloride, the reaction being shown at selected ones only of the several active hydrogen sites:

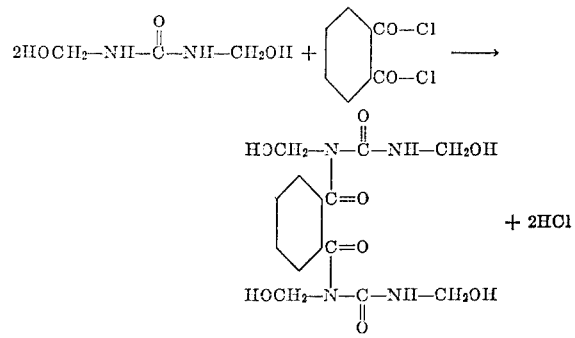

The invention will be further illustrated by description in connection with the following specific examples of the practice of it. In these examples and elsewhere herein proportions are expressed as parts by weight unless specifically stated to the contrary. The process was that described above, and the specific combinations of materials used were as shown in the several examples.

EXAMPLE 1

A condensation product of urea and formaldehyde in the molar ratio of 1:1.6 and containing 65% solids in the resulting water solution was prepared at pH 7.6–8.0.

100 parts of this urea-formaldehyde solution was treated with 1 part of diethylaminoethanol, as acid acceptor, followed by 0.5 parts phthaloyl chloride. The resulting resin concentrate (pH 7.6–8.0) was stable at room temperature for 2 months.

EXAMPLE 2

Resin was prepared in the same manner as in Example 1 except that the phthaloyl chloride was replaced by the same weight of isophthaloyl chloride.

EXAMPLE 3

Resin was prepared in the same manner as in Example 1 except that the phthaloyl chloride was replaced by the same weight of terephthaloyl chloride.

EXAMPLE 4

Resin was prepared in the same manner as in Example 1 except that the phthaloyl chloride was replaced by 0.4 part of adipyl chloride.

EXAMPLE 5

This resin was prepared in the same manner as in Example 1 except that the phthaloyl chloride was replaced by 0.65 part of pyromellitic dianhydride.

EXAMPLE 6

This resin was prepared in the same manner as in Example 1 except that the phthaloyl chloride was replaced by an equivalent weight of p,p'-dichlorosulfonyldiphenyl sulfone.

EXAMPLE 7

Resin was prepared in the same manner as in Example 1 except that the diethylaminoethanol was replaced by 1 part of 30% aqueous sodium hydroxide solution.

EXAMPLE 8

In this method, one side of a maple wafer was coated with phthaloyl chloride and one side of another coated with a 65% solution of urea-formaldehyde resin containing 1% of diethylaminoethanol as the acid acceptor. The two coated wafer were put together in Marra Laps and pressed at 240° F. (200 lbs. pressure) for 3 minutes. A bond of unusually high moisture resistance resulted from the in situ reaction of the said chloride and resin.

Products were bonded with the resins made as described and tested with the results shown below.

1. Boiling Water Tests

Maple laps, prepared by the modified urea-formaldehyde resins by pressing at 240° F. and 200 lbs. pressure, were subjected to the boiling water test.

The boiling water test consisted in submerging the laps in boiling water for 15 minutes and then oven drying for 40 minutes at 240° F. The number of boiling and drying cycles required to cause visible bond failure of each series was noted.

RESULTS OF BOIL TEST

| Resin made as described: | Number of cycles required for failure |
|---|---|
| Unmodified (no polyfunctional agent) | 2 |
| In Example 1 | 10 |
| In Example 2 | 8 |
| In Example 3 | 8 |
| In Example 4 | 8 |
| In Example 5 | 8 |
| In Example 7 | 12 |
| In Example 8 | 8 |

2. Completeness of Cure

Flakeboards were prepared a quarter-inch thick by impregnating 100 parts aspen flakes with 7 parts of the appropriate resin system (on the dry basis) and pressing at 300° F. for 10 minutes at 200 lbs. pressure. The formaldehyde evolution from these boards was determined by subjecting given weights of the boards to a stream of air (12 liters per hour) at 50° C. and 81% relative humidity for a period of 105 minutes. The evolved formaldehyde was absorbed into aqueous potassium hydroxide and analyzed by a colorimetric procedure using chromotropic acid.

| Resin: | Percent $CH_2O$ |
|---|---|
| Urea-formaldehyde (unmodified) | 0.0214 |
| Example 1 product | 0.001 |
| Example 5 product | 0.0143 |

3. Strength Tests

¼" aspen flakeboards prepared at 300° F. for 10 minutes, with various percentages of the resin systems were tested for modulus of rupture (MOR) and internal bond (IB). The increased strength shown by these systems when the resin was modified by the polyfunctional reagent, here phthaloyl chloride, is illustrated below:

| | Urea-formaldehyde resin | | | |
|---|---|---|---|---|
| Percent Resin | Unmodified | | 0.5% Phthaloyl chloride | |
| | MOR | IB | MOR | IB |
| 3 | 800 | 10 | 1,800 | 10 |
| 4 | 1,000 | 12 | 2,200 | 18 |
| 5 | 1,100 | 22 | 3,000 | 28 |
| 6 | 1,300 | 32 | 3,700 | 41 |
| 7 | 1,500 | 43 | 4,400 | 52 |
| Average | 1,140 | 24 | 3,020 | 30 |

It will be understood that it is intended to cover all changes and modifications of the examples of the invention herein chosen for the purpose of illustration which do not constitute departures from the spirit and scope of the invention.

We claim:

1. A resin composition that is storable in aqueous solution and that is curable at elevated temperatures without the addition of a catalyst for curing, the composition comprising the product of reaction of a methylolated acid curable aminoplast resin, prepared by the condensation reaction of a compound selected from the group consisting of formaldehyde, acetaldehyde, benzaldehyde, furfural, and acetone with a compound selected from the group consisting of urea, melamine, dicyandiamide, and thiourea, with a polyfunctional modifying agent selected from the group consisting of aromatic diacyl halides, aliphatic diacyl halides, aromatic disulfonyl halides and the dianhydrides of aromatic polycarboxylic acids containing at least four carboxyl groups wherein each anhydride group is derived from two sets of adjacent carboxyl groups, in the proportion of about 0.3–10 parts by weight of the polyfunctional modifying agent for 100 parts of the said resin.

2. The resin composition of claim 1 the said resin being the alkali catalyzed condensation product of about 1.5–2.5 moles of formaldehyde with 1 mole of urea.

3. The resin composition of claim 2 the modifying agent being phthaloyl chloride.

4. The resin composition of claim 2, the modifying agent being pyromellitic dianhydride.

5. The process of making an aminoplast resin composition which comprises mixing the condensation product of about 1.5–2.5 moles of formaldehyde with 1 mole of urea with an alkali acceptor for acid and with a polyfunctional modifying agent selected from the group consisting of aromatic diacyl halides, aliphatic diacyl halides, aromatic disulfonyl halides and the dianhydrides of aromatic polycarboxylic acids, containing at least four carboxyl groups wherein each anhydride group is derived from two sets of adjacent carboxyl groups, in the proportion of 0.3–10 parts by weight of the polyfunctional modifying agent for 100 parts of said condensation product and maintaining intimate contact between said condensation product acceptor and modifying agent until the pH of the mixture falls rapidly and then becomes practically constant, the acceptor being used in amount substantially equivalent as an alkali to the acidity of the said modifying agent.

6. The process of claim 5, the said modifying agent being phthaloyl chloride.

7. The process of claim 5, the said modifying agent being pyromellitic dianhydride.

8. The process of claim 5, the said acceptor of acid being an alkali metal hydroxide.

References Cited in the file of this patent

UNITED STATES PATENTS

| 2,022,233 | Ellis | Nov. 26, 1935 |
| 2,407,177 | Roblin et al. | Sept. 3, 1946 |
| 2,631,138 | Dannenberg | Mar. 10, 1953 |
| 2,949,474 | Murdock et al. | Aug. 16, 1960 |

FOREIGN PATENTS

| 574,026 | Canada | Apr. 14, 1959 |
| 662,007 | Great Britain | Nov. 28, 1951 |